INVENTORS
Wilbur F. Jackson and
Theodore J. Dykzeul
THEIR ATTORNEY.

April 7, 1959    W. F. JACKSON ET AL    2,880,936
THERMOSTATIC CONTROL DEVICE
Filed March 23, 1955    4 Sheets-Sheet 4

INVENTORS
Wilbur F. Jackson and
Theodore J. Dykzeul
BY
THEIR ATTORNEY.

United States Patent Office 2,880,936
Patented Apr. 7, 1959

2,880,936

THERMOSTATIC CONTROL DEVICE

Wilbur F. Jackson and Theodore J. Dykzeul, Compton, Calif., assignors to Robertshaw-Fulton Controls Company, Greensburg, Pa., a corporation of Delaware Application March 23, 1955, Serial No. 496,140

4 Claims. (Cl. 236—21)

The present invention relates to fuel control devices for fluid fuel burners and more particularly to fuel control devices including a thermostatically controlled valve and a main shut-off valve. While it is recognized that the thermostatic controls for gas-fired appliances are old where they incorporate a combination rod and tube organized to operate a snap-action valve mechanism and while it is also old to provide one type or another of a main shut-off cock and a safety valve with a resetting means, there are several undesirable features in the presently-used devices which limit their acceptability and use.

It is, therefore, among the objects of this invention to improve the presently used devices by providing an improved design and arrangement of parts which will furnish additional features and lower unit cost.

Another object of the invention is to incorporate in a thermostatic control device, a manually operable sleeve valve within a rotary plug valve to regulate the flow of fluid permitted by the plug valve when in its "open" position.

Another object of this invention is to incorporate in a thermostatic control device, an improved interlocking mechanism between the shut-off valve and reset means for the safety valve which permits removal of the shut-off valve without disturbing the interlocking means or the resetting means.

Another object of this invention is to incorporate in a thermostatic control device, a biasing means which is operative to affect operation of the manually operable knob and to hold a cover plate in an active position with respect to the casing.

Another object of this invention is to incorporate in a thermostatic control device a sealing means which permits positioning of a valve operating shaft across a fuel passage thus, increasing the compactness of the device.

In the preferred embodiment of the invention, a thermostatically controlled snap-action valve mechanism is provided for controlling the flow of fuel to a main burner. A plug valve is positioned in a fuel passage between the snap-acting valve mechanism and the inlet for controlling the flow of fuel thereto. The plug valve is provided with "on," "off" and "pilot" positions and includes a rotary sleeve valve mounted within which is adapted to vary the flow of fuel as permitted by the plug valve when in the "on" position. A thermoelectric safety shut-off means is provided in the fuel passage between the plug valve and the inlet. An interlocking means is operatively positioned between a reset means for the safety shut-off means and the plug valve to permit resetting of the safety shut-off means during a predetermined position of the plug valves. Means are provided to permit removal of the plug valve from the casing without disturbing the interlocking mechanism. An improved sealing means is provided which permits the positioning of the snap-action valve mechanism and a temperature adjusting dial on opposite sides of a fuel passage with the connecting operating shaft extending through the fuel passage. A biasing means is provided which is operative to create a friction force which tends to prevent rotation of the temperature adjusting dial and to hold a cover plate to the casing.

Other objects and advantages will become apparent from the following description taken in connection with the accompanying drawings, wherein.

Figure 1:
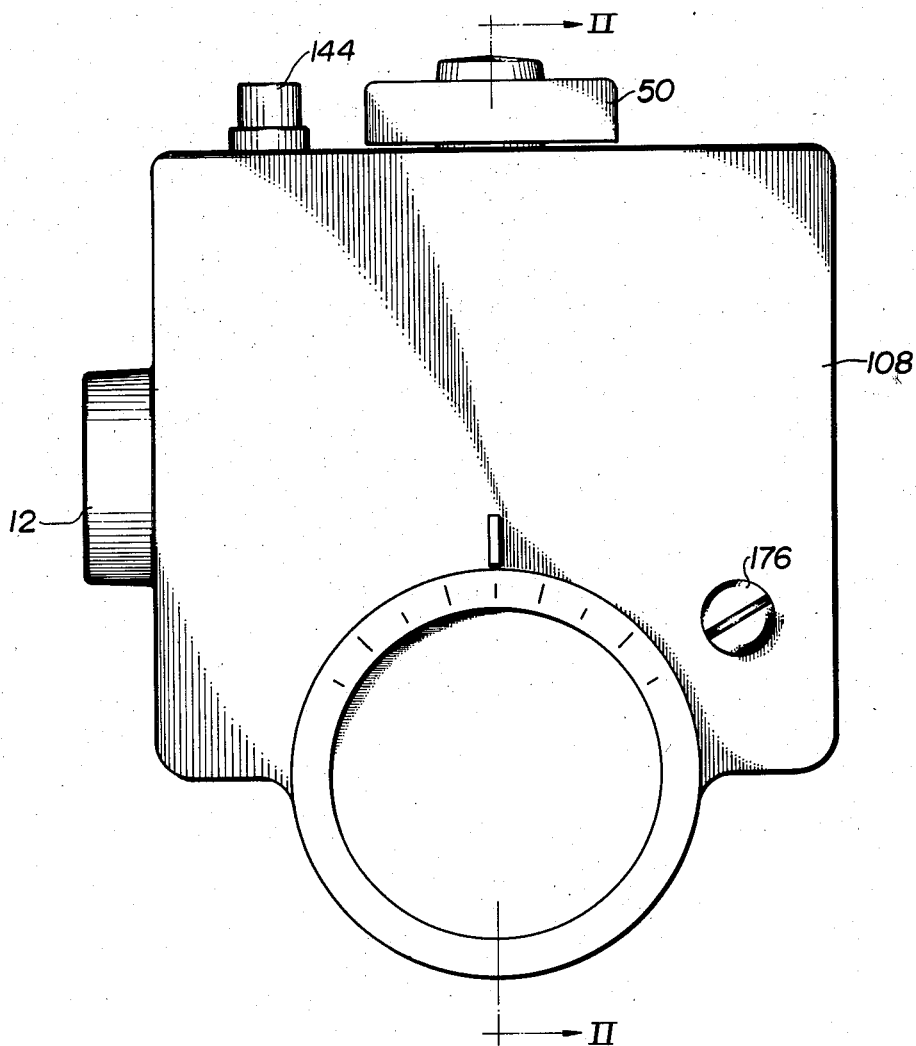
Fig. 1 is a front elevation of the control device embodying this invention.

Referring more particularly to the drawings, the control device comprises a casing 10 provided with an inlet 12 and an outlet 14 for supplying fuel to a main burner and an outlet 16 for supplying fuel to the pilot burner. A main fuel passage 18 through the casing 10 provides communication between the inlet 12 and the outlet 14. A pilot passage 20 provides communication between the pilot outlet 16 and a valve chamber later to be described. As is customary in such devices, suitable pipe or tubing connections may be provided at the inlet 12 and outlets 14, 16.

A conical bore 22 is provided in the upper part of the casing 10 and positioned so as to have the main fuel passage 18 opening into the side thereof and continuing out the bottom thereof. The pilot fuel passage 20 opens into the opposite side of the conical bore and is of smaller diameter than the main fuel passage 18.

A plug valve 24, of generally conical configuration and having a cylindrical bore 26 in the lower portion thereof, is seated in the conical bore 22 and is adapted for turning movement therewithin. A circular opening 27 is provided in the wall of the plug valve 24 and is adapted to allow communication between the passage 18 and the interior of the plug valve 24. A recess 28 is positioned on the opposite side of the plug valve 24 and cooperates with a recess 25 in the bore 22 to allow communication between the passage 18 and the pilot passage 20.

It can now be seen that when the plug valve 24 is turned to align the opening 27 with the passage 18, fuel will flow through the opening 27 into the cylindrical bore 26 of the plug valve 24 and out the open bottom thereof toward the outlet 14. The recess 25 is so positioned in relation to the recess 28 that communication is established between the passage 18 and the pilot passage 20 when the opening 27 faces the passage 18. Thus, fuel will flow around the periphery of the valve 24 in the recesses 25 and 28 and into the pilot passage 20.

If the plug valve is turned clockwise until the opening 27 faces the wall of the conical bore 22, flow of fuel will be prevented through the passage 18 to the outlet 14. However, the recess 28 is of sufficient size to still allow flow of fuel into the pilot passage 20. Further rotation of the plug valve 24 moves the recess 28 to a fuel flow preventing position thus preventing flow to both the outlets 14, 16. Thus, the plug valve 24 permits a supply of fuel to the main burner and pilot burner when in one ("on") controlling position, permits the supply of fuel to the pilot burner in a second ("pilot") controlling position and prevents supply of fuel to both the pilot and main burner when in a third ("off") controlling position.

A cylindrical end portion 29 of the plug valve 24 projects exteriorly of the casing 10, and has a cylindrical bore 30 of smaller diameter than the bore 26 and axially aligned therewith. A spring 31 encircles the end portion 29 and is mounted in compression between a recess formed in the valve 24 and a washer later to be described. An adjusting shaft 32, axially aligned with the bore 26, extends through the bore 30 and has a flanged end portion 34 engaging the upper end of the bore 26. The other end 36 of the adjusting shaft 32 extends slightly past the end portion 29 and is provided with a slot 38 which enables the adjusting shaft 32 to be manually rotated. A washer 40 having an extending spring portion 42 is located below the slotted end 38 and is retained by clip 41 seated in an annular groove and biased toward the slotted end 38 by a spring 46 positioned between the washer 40 and a shoulder 48 formed in the bore 30. The extending spring portion 42 is adapted to create a biasing force which tends to hold a manually operable knob 50 to the projecting end portion 29 of the plug valve 24.

A slide valve 52 comprising a split sleeve of flexible material and of normally larger diameter than the cylindrical bore 26 is positioned in the cylindrical bore 26 and engages the wall thereof and becomes axially aligned therewith by its inherent bias toward an expanded condition. The upper end of the slide valve 52 is provided with two upturned portions 54, 54 which are adapted to engage the upper surface of the flanged end 34 of the adjusting shaft 32. A narrow resilient portion 56 extends from the end of the slide valve 52 intermediate the upturned portions 54, 54 and at an angle to the longitudinal axis of the slide valve 52. The portion 56 is adapted to be received by the slot 58 in the bottom of the flanged end portion 34 of the adjusting shaft 32. When the upturned portions 54, 54 are engaging the top of the flanged end portion 34, the portion 56 will be received by the slot 58 and forced to a position normal to the longitudinal axis of the slide valve 52, thus creating a biasing force which tends to force the upturned portions 54, 54 into engagement with the flanged end portion 34. The portion 56 when received in the slot 58 also forces the slide valve 52 to turn in the cylindrical bore 26 in response to rotation of the adjusting shaft 32.

The effect of the slide valve 52 can now be easily seen. When the open side of the slide valve 52 faces the opening 27, normal flow of fuel is permitted through the opening 27 and into the cylindrical bore 26. However, should turning of the slide valve 52 be effected by rotation of the adjusting shaft 32, the surface of the slide valve 52 will partially close the opening 27 and reduce the flow of fluid therethrough. Further rotation of the adjusting shaft 32 will cause the surface of the slide valve 52 to restrict the opening 27 and decrease flow of fuel therein. Thus, the position of the sleeve valve 52 determines the amount of fuel which will be supplied to the main burner when the plug valve 24 is in its hereinbefore described "open" position.

A valve chamber 60 is positioned in the main fuel passage 18 between the outlet 14 and the plug valve 24. A thermostatically controlled valve 62, which may be of any suitable form, is positioned in the valve chamber 60 and cooperable with the valve seat 64 to control the flow of fuel through the valve chamber 60. The valve 62 is biased toward the valve seat 64 by a spring 66 which is mounted in compression between the valve 62 and a plate 68. A valve stem 70 is suitably connected to the valve 62 and projects through a bushing 72 formed in the casing 10 to extend into engagement with a snap-acting mechanism 74 of a type well known in the art. An operating button 76 of the snap-acting mechanism 74 abuts a suitable projection 78 formed in an end of an operating lever 80. The other end of the operating lever 80 engages the end of an operating shaft later to be described.

Thermally responsive actuating means is provided for actuating the snap-action mechanism 74 and includes a thermal element of the rod and tube type with a tube 82 of expansible material secured to the casing 10 by a bracket 84 and a rod 86 of relatively non-expansible material extending into the casing 10 and being free to move relative thereto. The free end of the rod 86 is in engagement with a recess 88 formed in the operating lever 80 in the central portion thereof.

An operating shaft 90 engages a recess 91 at the lower end of the operating lever 80 which defines a pivoting point therefor. A sleeve 92 extends across the passage 18 through the outlet 14 and has one end thereof press fitted and sealed within a hole in the casing 10, the other end thereof having a flanged portion 93 abutting a gasket 95 to provide effective sealing. Thus, the hollow interior of the sleeve 92 is sealed from the passage 18. The operating shaft 90 extends from the recess 91 through the sleeve 92 and has the opposite end thereof engaging an adjusting screw 94 which is threaded within a bushing 96. The bushing 96 is also threaded within the casing 10 and holds the flanged portion 93 in engagement with the gasket 95. The adjusting screw 94 has an end thereof projecting from the casing 10 to which is attached thereto a stop 98 and a washer 102, having an extending spring portion 103, by a screw 100 threaded within the adjusting screw 94.

A flange 104 is fixed to the other end of the stop 98 and is adapted to seat a manually operable knob 106 which is slidably received by the stop 98 and biased to a rigid position therewith by the spring portion 103.

It will be apparent to those skilled in the art that rotation of the adjusting screw 94 by the knob 106 relative to the casing 10 will effect axial movement thereof to adjust the pivoting point of the lever 80 through a range of positions and that the temperature at which the rod and tube thermal element 82, 86 will cause actuation of the snap-action mechanism 74 and the valve 62 will be determined by the position of the lever 80. Since temperature setting and actuating mechanisms for thermostatically controlled valves of the type herein disclosed are well known in the art, further description is deemed unnecessary.

Figure 2:
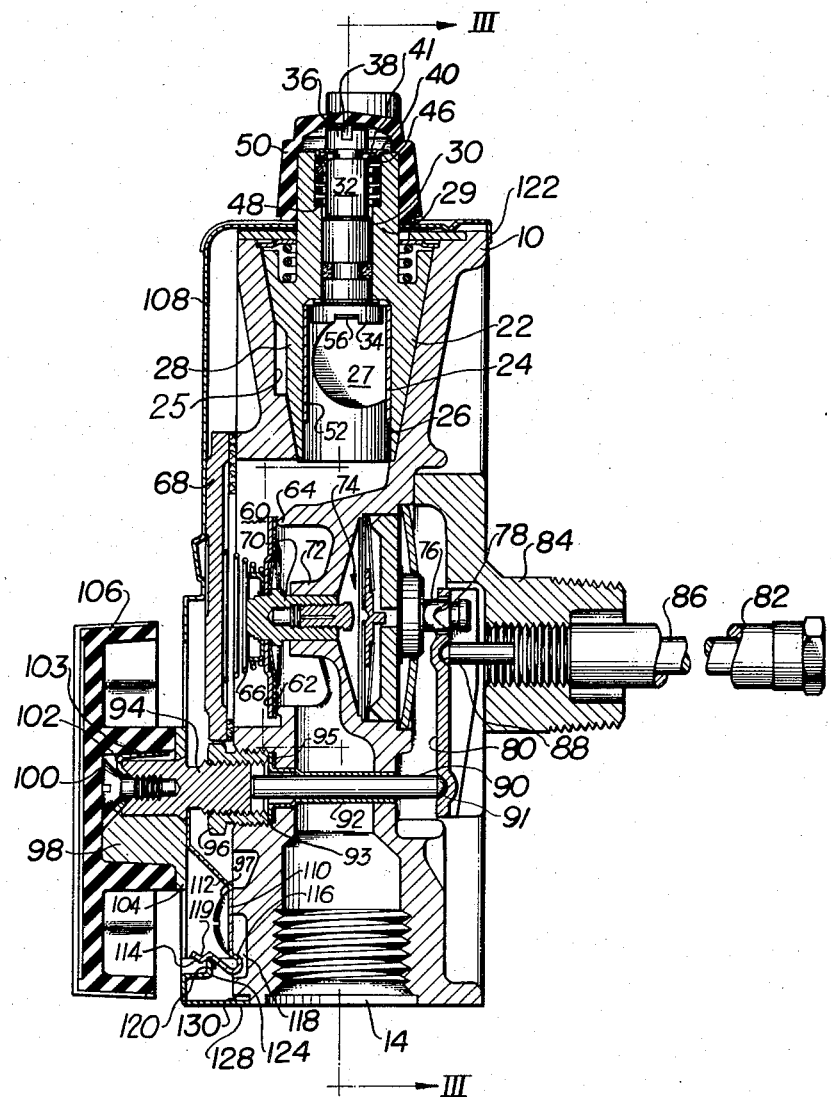
Fig. 2 is a sectional view taken on the line II—II of Fig. 1.

To increase the frictional force restricting movement of the knob 106, and to attach a cover plate 108 to the casing 10, a spring member 110 is attached to the casing 10 to the right of the knob 106 by suitable screw fasteners 97. One end 112 projects away from the casing 10 to engage the under side of the adjusting screw 94 thus creating a friction force which tends to prevent rotation thereof and prevent accidental movement of the knob 106. The other end 114 of the spring 110 projects from the opposite side of the screw 97 to define a curved portion 116, which is positioned in a recess 118 formed in the casing 10, and a reversely bent portion near the end thereof defining two bights 119, 120. The cover plate 108 which encloses the left and upper sides of the casing 10 as seen in Fig. 2 has one upturned end 122 engaging the corner of the casing 10 and another upturned portion 124 which is adapted to be held in the bight 120 of the reversely bent portion by the inherent bias of the spring 110. Another upturned end 128 engages a recess 130 formed in a corner of the casing 10 near the knob 106. Thus, if the upturned end 122 is placed in engagement with the corner of the casing 10, the upturned portion 124 may be snapped past the bight portion 119 of the spring 110 to engage the bight 120 and to fix the cover plate 108 to the casing 10.

As is customary in such devices, a safety means is provided which will shut off the flow of fuel to both the main and pilot burners in event of failure of the flame at the pilot burner. To this end, a safety valve 131 is positioned in a chamber 132 which is in communication with the inlet 12 and the passage 18. The valve 131 is cooperable with a valve seat 134 to control the flow of fuel to the plug valve 24. A valve stem 136 has one end operatively attached to the valve 131 and the other end extending into a housing 138 and operatively connected to a thermoelectric safety means (not shown) contained within. This thermoelectric safety means comprises a thermocouple 140 located in proximity of the flame at the pilot burner and having its ends connected to a winding carried on a frame of an electromagnet. An armature is engageable with the pole faces of the magnet frame when in attracted position and is spaced therefrom in released position. It will be understood that the current generated by the thermocouple 140 when heated by the flame of the pilot burner is insufficient to attract the armature into engagement with the pole faces of the magnet but is sufficient to maintain such relation when the armature has been placed in an attracted position. Since the valve 131 is operatively connected to the armature, it will be held in its open position when the armature is attracted into engagement with the pole faces of the magnet. A spring 142 is mounted in compression between the housing 138 and the valve 131 and thus serves to bias the valve 131 towards a closed position. Thus, the armature is biased towards a released position. Thermoelectric safety devices of the described type are well known in the art and a detailed drawing of an electromagnet and the armature as contatined in the housing 138 is deemed unnecessary.

Manually operable means are provided for resetting the armature from its released to its active position and thus the valve 131 from its closed to its open position and comprises a resetting button 144 slidably mounted in a guide 146 formed in a cover plate 148. The enlarged portion of the button 144 cooperates with a flange 150 formed on the end of the guide 146 to prevent ejection of the button 144 from the guide 146 by a spring 151. A spring 152 is mounted in compression between a washer 153 and the lower end of a cup 154 secured to the casing 10. A stem 156 is guided by the button 144 for movement therewith of the washer 153 and the spring 151 mounted in compression between the upper side of the washer 153 and the end of the button 144. The other end of the stem 156 slidably extends through the cup 154 and toward the valve 131 and is axially aligned therewith. It can be seen that movement of the button 144 toward the housing 138 will cause movement of the valve 131 to an open position thus causing the armature to move to its attracted position.

It can be seen that it would be hazardous to conduct the above-described resetting operation when the plug valve 24 is in the "on" position. Thus, it is necessary to provide a means which will permit resetting of the valve 131 only when the plug valve 24 is in its pilot position. To this end, a novel interlocking mechanism is provided between the button 144 and the plug valve 24 and comprises a ball 160, a connecting member 162, and a spring 164 which are positioned in a chamber formed by the cover plate 148 and the casing 10. In the position shown, the ball 160 engages an annular indentation 166 formed in the lower end of the button 144. An upturned portion 167 of the angle-shaped member 162 is positioned between the ball 160 and the spring 164. The spring 164 is mounted in compression between the upturned portion 167 and the casing 10. An extending portion 168 of the connecting member 162 is slidably positioned between the cover plate 148 and the casing 10.

Figure 3:
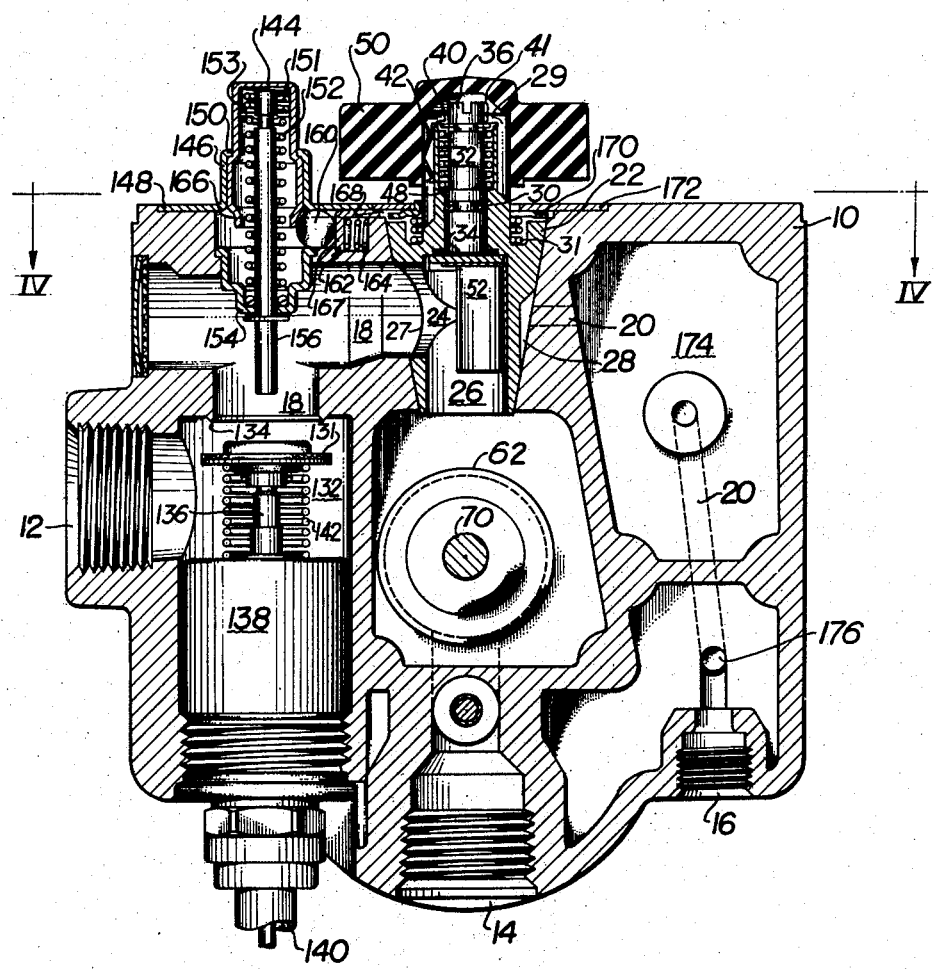
Fig. 3 is a sectional view taken on the line III—III of Fig. 2.
Figure 5:
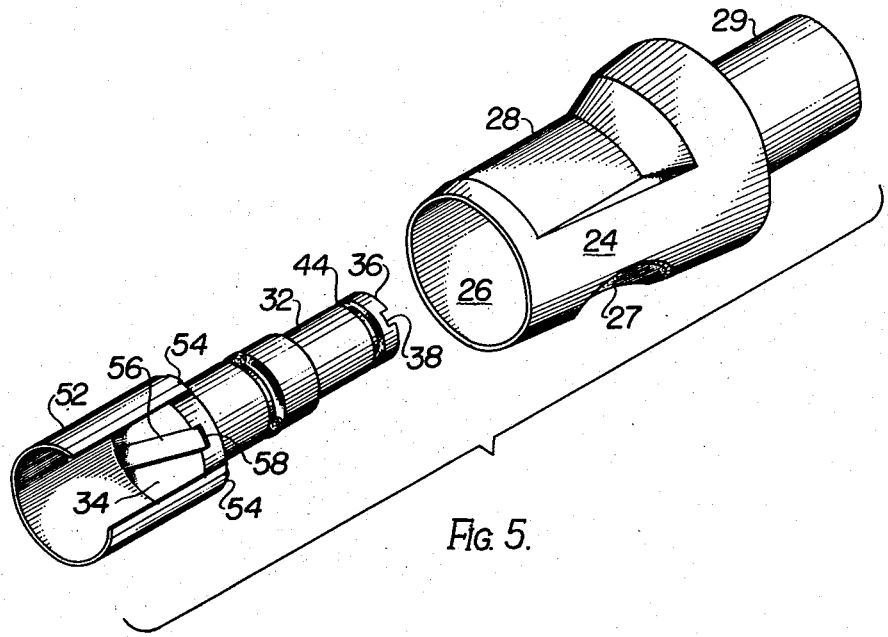
Fig. 5 is an exploded perspective view of a portion of the control device.
Figure 4:
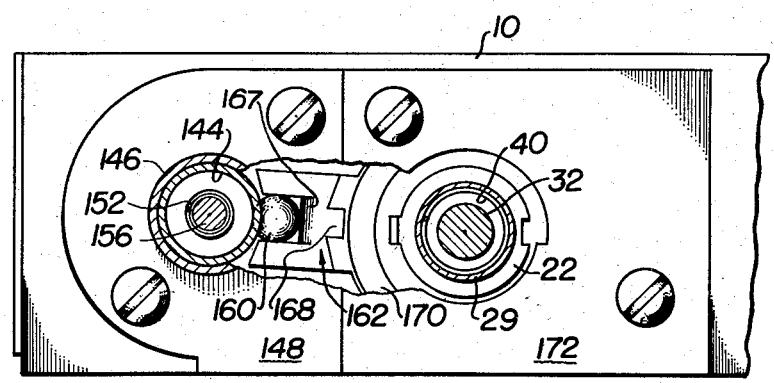
Fig. 4 is a fragmentary sectional view taken on the line IV—IV of Fig. 3.

The spring 164 thus biases the ball 160 into engagement with the indentation 166 and the member 162 into engagement with the ball 160. Should the button 144 be pushed downward to conduct the hereinbefore described resetting operation, the ball 160 will be forced to the right, as viewed in Fig. 3, when engaged by the shoulder defined by the indentation 166 forcing the extending portion 168 to slide to the right between the cover plate 148 and the casing 10.

To prevent movement of the interlocking mechanism when the plug valve 24 is in its "on" position, a washer 170 is fixed to the end portion 29 of the plug valve 24. The washer 170 is provided with a cam surface which is positioned to stop the extending portion 168 if the resetting operation should be attempted when the plug valve 24 is in its "on" position. If the extending portion 168 engages the cam surface as above described, it can be seen that downward movement of the button 144 will be prevented thus preventing the resetting operation.

A second cover plate 172 is attached to the casing 10 adjacent the cover plate 148 and permits removal of the plug valve 24. Thus, it can be seen that the novel arrangement of interlocking mechanism permits removal of the plug valve 24 from the casing 10 without disturbing the interlocking mechanism. This is one of the main features of this invention.

Positioned on one side of the plug valve 24 is a chamber 174 in which a customary filter may be located. The pilot passage 20 enters the upper part of the chamber 174 and continues out the central portion thereof to the pilot outlet 16. The rate of flow through the pilot passage 16 may be regulated by the usual needle valve 176 of any suitable form.

It is now to be noted that by reason of the improved sealing result obtained by means of the sleeve 92, an improved and more compact structure has been provided. It can be seen that the longitudinal axis of the plug valve 24, valve chamber 132, housing 138, resetting means, filter chamber 174, passages 18, 20, interlocking mechanism, inlet 12 and outlets 14, 16, and the transverse axis of the valve 62 lie on substantially the same plane thus providing a narrow compact structure.

Operation

To place the control device in an operative condition, the dial 50 is rotated to the "pilot" position wherein the recess 28 establishes communication between the main fuel passage 18 and the pilot passage 20. In such position of the valve 24, fuel will be permitted to flow around the valve 24 by the recess 28, through the pilot passage 20, through the filter chamber 174 and out the outlet 16 to the pilot burner.

Since the interlocking mechanism is operative to permit the reset operation when the dial 50 is in the "pilot" position, the button 144 is manually depressed to cause engagement of the armature with the pole faces of the magnet and movement of the valve 131 away from seat 134 to allow flow of fuel from the inlet 12 to the plug valve 24 and by the above described path to the pilot burner where it may be ignited by a match or the like.

The flame at the pilot burner will heat the hot junction of the thermocouple to cause the same to develop sufficient current to energize the winding of the electromagnet. The reset button 144 is now released, but the armature remains in its attracted position and thus the valve 131 in its open position.

The plug valve 24 may now be rotated by the dial 50 to the "on" position wherein the opening 27 is aligned with the passage 18 to allow flow of fuel through the plug valve 24 to the thermostatic valve. Upon a demand for heat, the rod 86 exerts a force on the lever 80 which causes the lever 80 to pivot on the end of the operating shaft 90 and cause movement of the button 76 of the snap mechanism 74 which opens the valve 62 against the bias of the spring 66. Fuel is now permitted to flow to the main burner.

When the temperature sensed by the thermostat 82, 86 is that for which the adjustment has been set, closure of the valve member occurs under bias of the spring 66 and is permitted due to reverse positioning of the snap-action mechanism as is well known to those skilled in the art. During this normal reciprocation of the valve 62 in controlling flow of fuel to the outlet 14, the safety valve 131 remains in its open position. The temperature at which the snap mechanism 74 will operate to open or close the valve 62 may be varied by rotating the dial 106 to change the pivoting point of the lever 80 in a manner well known in the art.

Should it be necessary to reduce the amount of fuel as supplied to the main burner when the dial 50 is in the "on" position, the adjusting shaft 32 may be rotated to cause the sleeve valve 52 to be rotated and partially close the opening 27 in the plug valve 24. When the valve 62 now opens in response to a decrease in the temperature, a reduced amount of fuel will be supplied to the main burner and the flame thereat will be correspondingly lower. This adjustment provides the device with increased applications and control and is one of the main features of the invention.

Should the flame at the pilot burner become extinguished, the safety valve 131 will close, and supply of fuel to the plug valve 24 will be shut off. To conduct the hereinbefore described resetting operation, it will be necessary to first rotate the dial 50 until the plug valve 24 is in the "pilot" position, in which the resetting operation may be effected as above described.

To remove the plug valve 24 from the casing 10 for servicing or replacement, it is only necessary to remove the cover plate 172. The plug valve 24 may then be easily removed without disturbing the interlocking mechanism. This is another of the important features of this invention.

It will be understood that many changes may be made in the details of construction and arrangement of parts without departing from the scope of this invention as defined in the appended claims.

It is claimed and desired to secure by Letters Patent:

1. In a temperature control device, a casing having a passage for fluid therethrough, valve means movable between controlling positions for controlling the flow of fluid through said passage, control means mounted exteriorly of said casing for controlling the operation of said valve means, a cover plate associated with said casing, yieldable means for holding said cover plate in an active position with respect to said casing, and means including said yieldable means for increasing the force necessary to operate said control means.

2. In a burner control device, the combination comprising a casing having an inlet and an outlet connected by a passage for fluid, a valve member mounted in said casing and rotatable between positions for controlling fluid flow through said passage, thermoelectric safety shut-off means for controlling fluid flow through said passages independently of said valve member, reset means for said safety shut-off means positioned in parallel axial relationship with said valve member, interlocking means mounted for rectilinear movement between said valve member and said reset means for preventing operation of said reset means when said valve member is in one of said positions, a cover plate associated with said casing for holding said reset means and said interlocking means in an operative position within said casing, a second cover plate associated with said casing for holding said valve member in an operative position within said casing, and means associated with said casing and cooperative with the first said cover plate for limiting said rectilinear movement of said interlocking means when said valve member is in another of said positions.

3. In a burner control device, the combination comprising a casing having an inlet and outlet connected by a passage for fluid, a valve member mounted in said casing and rotatable between positions for controlling fluid flow through said passages, thermoelectric safety shut-off means for controlling fluid flow through said passages independently of said valve member, reset means positioned in parallel axial relationship with said valve member and movable axially to effect resetting of said safety shut-off means, interlocking means movable laterally of said reset means upon axial movement thereof, abutment means associated with said valve member operative to prevent lateral movement of said interlocking means in one position thereof and thereby prevent resetting of said safety shut-off means, means associated with said casing for limiting lateral movement of said interlocking means in another of said positions of said valve member, a cover plate cooperative with said casing and the last said means for holding said interlocking means in an operative position within said casing, and a second cover plate associated with said casing for holding said valve member in an operative position within said casing independently of said interlocking means and said reset means.

4. In a temperature control device, the combination comprising a casing having an inlet and a pair of outlet openings and passages connecting said inlet opening with said outlet openings for supplying fuel to a main burner and a pilot burner, said inlet opening, outlet openings and said passages having longitudinal axes substantially defining a plane, a main shut-off cock positioned in said casing between said inlet opening and said outlet openings and rotatable between positions for controlling the supply of fuel to both the main burner and pilot burner, said shut-off cock having a longitudinal axis substantially lying in said plate, electromagnetic safety means responsive to a flame at the pilot burner positioned in substantially spaced parallel axial relationship with said shut-off cock, reset means for said electromagnetic safety means positioned in axial alignment therewith, said electromagnetic safety means and said reset means defining a longitudinal axis which lies in said plane, interlocking means between said reset means and said cock and defining a longitudinal axis substantially normal to the longitudinal axes of said safety means and said reset means and lying in said plane, thermally responsive valve means for controlling the flow of fuel to the main burner, manually operable control means for said shut-off cock and said reset means, said control means defining spaced longitudinal axes which are substantially parallel and lie in said plane, and manually operable control means for said thermally responsive means defining a longitudinal axis substantially normal to said plane.

References Cited in the file of this patent

UNITED STATES PATENTS

| | | |
|---|---|---|
| 802,477 | Robertshaw | Oct. 24, 1905 |
| 1,087,908 | Reinecke | Feb. 17, 1914 |
| 2,105,331 | Rasmussen | Jan. 11, 1938 |
| 2,361,944 | Jackson | Nov. 7, 1944 |
| 2,372,537 | Wantz | Mar. 27, 1945 |
| 2,409,947 | Mantz | Oct. 22, 1946 |
| 2,515,229 | Jenkins | July 18, 1950 |
| 2,650,610 | Brumbaugh | Sept. 1, 1953 |
| 2,707,092 | Bowditch | Apr. 26, 1955 |

FOREIGN PATENTS

| | | |
|---|---|---|
| 684,106 | Great Britain | Dec. 10, 1952 |